(12) United States Patent
Kawamoto

(10) Patent No.: US 7,686,725 B2
(45) Date of Patent: *Mar. 30, 2010

(54) REDUCTION GEAR

(75) Inventor: Hisashi Kawamoto, Chiba (JP)

(73) Assignee: Seiko Precision Inc., Narashino-shi ( * ) Notice: Subject to any disclaimer, the term of this patent is extended or adjusted under 35 U.S.C. 154(b) by 0 days.

This patent is subject to a terminal disclaimer.

(21) Appl. No.: 12/188,536

(22) Filed: Aug. 8, 2008

(65) Prior Publication Data

US 2008/0305909 A1 Dec. 11, 2008

Related U.S. Application Data

(63) Continuation of application No. PCT/JP2007/052238, filed on Feb. 8, 2007.

(30) Foreign Application Priority Data

Feb. 9, 2006 (JP) ............... 2006-032961

(51) Int. Cl.
*F16H 48/06* (2006.01)
(52) U.S. Cl. .................................... 475/149
(58) Field of Classification Search ............. None
See application file for complete search history.

(56) References Cited

U.S. PATENT DOCUMENTS

| | | | | |
|---|---|---|---|---|
| 3,019,594 A * | 2/1962 | Sundt | ............ | 368/185 |
| 4,914,981 A * | 4/1990 | Hummel et al. | .......... | 74/837 |
| 5,123,883 A * | 6/1992 | Fukaya | .............. | 475/178 |
| 6,508,737 B2 * | 1/2003 | Fujimoto | ............ | 475/178 |
| 6,656,076 B2 * | 12/2003 | Strowik et al. | .......... | 475/178 |
| 6,857,981 B2 * | 2/2005 | Hori et al. | .......... | 475/149 |
| 7,326,143 B2 * | 2/2008 | Kimura et al. | .......... | 475/162 |
| 2003/0032518 A1 * | 2/2003 | Kapaan et al. | .......... | 475/162 |
| 2009/0133518 A1 * | 5/2009 | Kawamoto | ............ | 74/89 |
| 2009/0168208 A1 * | 7/2009 | Katsumata et al. | ........ | 359/823 |

FOREIGN PATENT DOCUMENTS

| | | |
|---|---|---|
| JP | 2-56943 | 4/1990 |
| JP | 3-260436 | 11/1991 |
| JP | 4-290643 | 10/1992 |
| JP | 7-133847 | 5/1995 |
| JP | 11-351340 | 12/1999 |
| JP | 3034630 | 2/2000 |
| JP | 2005-36915 A1 | 2/2005 |

OTHER PUBLICATIONS

International Search Report for International Application No. PCT/JP2007/052238 dated Apr. 17, 2007.

* cited by examiner

*Primary Examiner*—Dirk Wright
(74) *Attorney, Agent, or Firm*—Kratz, Quintos & Hanson, LLP

(57) ABSTRACT

A reduction gear includes a reduction mechanism, which includes: an external gear eccentrically rotatable about an input shaft; an internal gear internally meshing with the external gear and having a small number of difference between the teeth of the internal gear and the external gear; a disk for extracting only a rotational component of the external gear; an output shaft; and gears for transmitting the rotational component of the external gear from the disk to the output shaft. The disk, the gears and the output shaft are aligned in a direction perpendicular to an axial direction of the input shaft.

4 Claims, 4 Drawing Sheets

REDUCTION GEAR

This application is a continuation of international application PCT/JP2007/052238 filed Feb. 8, 2007.

BACKGROUND OF THE INVENTION

1. Field of the Invention

The present invention relates to reduction gears, and more particularly, to a reduction gear including a reduction gear mechanism having an external gear eccentrically rotatable about an input shaft; an internal gear internally being meshed with the external gear and having a small number of difference between the teeth of the internal gear and the external gear, and an output shaft for extracting a rotation of the external gear.

2. Description of the Related Art

Conventionally, there has been known a reduction gear including an input shaft, an eccentric body rotated by the rotation of the input shaft, an external gear attached to the eccentric body and swung, an internal gear internally meshing with the external gear, and an output shaft coupled to the external gear through an extracting member for extracting only an rotational component of the external gear (see Japanese Patent No. 3034630). Such a reduction gear enables the input shaft to be decelerated for rotating and rotate the output shaft.

In the above-mentioned gear reduction, however, the output shaft is arranged on an axial line of the input shaft. Therefore, the input shaft, an extracting member for extracting a rotational component of the external gear, a transmitting member for transmitting the extracted rotational component of the external gear to an output shaft, and the output shaft are arranged in the axial direction. This causes a problem that the gear reduction increases in thickness thereof and cannot be downsized. Consequently, it is difficult that an electronics device, such as a digital camera, required to be downsized employs the above reduction gear.

SUMMARY OF THE INVENTION

It is therefore an object of the present invention to provide a reduction gear that has a reduced thickness in an axial direction and is downsized.

According to an aspect of the present invention, there is provided a reduction gear including a motor including, an input shaft, a rotor rotating in conjunction with the input shaft, a stator, and a coil wound around the stator; a reduction mechanism including, an external gear eccentrically rotatable about an input shaft, an internal gear internally meshing with the external gear and having a small number of difference between the teeth of the internal gear and the external gear, a extracting member for extracting only a rotational component of the external gear, an output shaft, and a transmitting member for transmitting the rotational component of the external gear from the extracting member to the output shaft; and a positioning plate sandwiched between the reduction mechanism and the motor; wherein the positioning plate has a hole for receiving a thickness of the coil, and the extracting member, the transmitting member, and the output shaft are aligned in a direction perpendicular to an axial direction of the input shaft.

With such a configuration, the outputting member, the transmitting member, and the output shaft are aligned in the direction perpendicular to the input shaft. This allows the reduction gear to reduce the thickness thereof in the direction of the axis and to be downsized, as compared to when the input shaft, the extracting member, the transmitting member, and the output shaft be aligned in the direction of the axis. Therefore, the reduction gear can be downsized. Additionally, a rotational component of the external gear can be transmitted in the direction perpendicular to the input shaft.

Additionally, the extracting member may be rotated in response to a rotation of the external gear, and the transmitting member may include gears being each formed in the extracting member and the output shaft, the gears being meshed with each other.

These arrangements allow the output shaft to be rotated in response to the rotation of the output member.

Moreover, by changing in the number of teeth of at least one of the gears, a reduction ratio between the input shaft and the output shaft can be changed with easy without changing in the number of teeth of the external gear or those of the internal gear.

Furthermore, the extracting member extracts only the rotational component of the external gear. Therefore, as compared to where an external gear is directly rotated by a belt member and output shaft is rotated in response to the external gear, the output shaft is not affected by a swingable component of the external gear.

Additionally, as compared to where the output shaft is rotated by the belt member, the distance between the input shaft and the output shaft can be shortened. Therefore, the width, perpendicular to axial direction, of the reduction gear can be minimized.

Furthermore, the output shaft may be rotatably supported by a bearing portion integrally formed in the internal gear.

With such a configuration, the output shaft can be positioned by the internal gear. This eliminates the need for separately providing a positioning member or a bearing portion for the output shaft, thus reducing the number of parts and facilitating the assembling process.

In addition, the positioning plate may have a front face for positioning the reduction mechanism and a back face for positioning the motor transmitting a driving force to the input shaft.

These arrangements enable a single member to position the reduction gear mechanism and the motor. This makes it possible to reduce the axial thickness of the reduction gear including the motor. Also, the single member enables the reduction gear mechanism and the motor to be positioned, so that it is possible to improve the assembling ability, leading to the reduced manufacturing cost.

With above structure, it is therefore an object of the present invention to provide a reduction gear that has a reduced thickness in an axial direction and is downsized.

DETAILED DESCRIPTION

A description will now be given, with reference to the accompanying drawings, an embodiment of the present invention.

Figure 1:
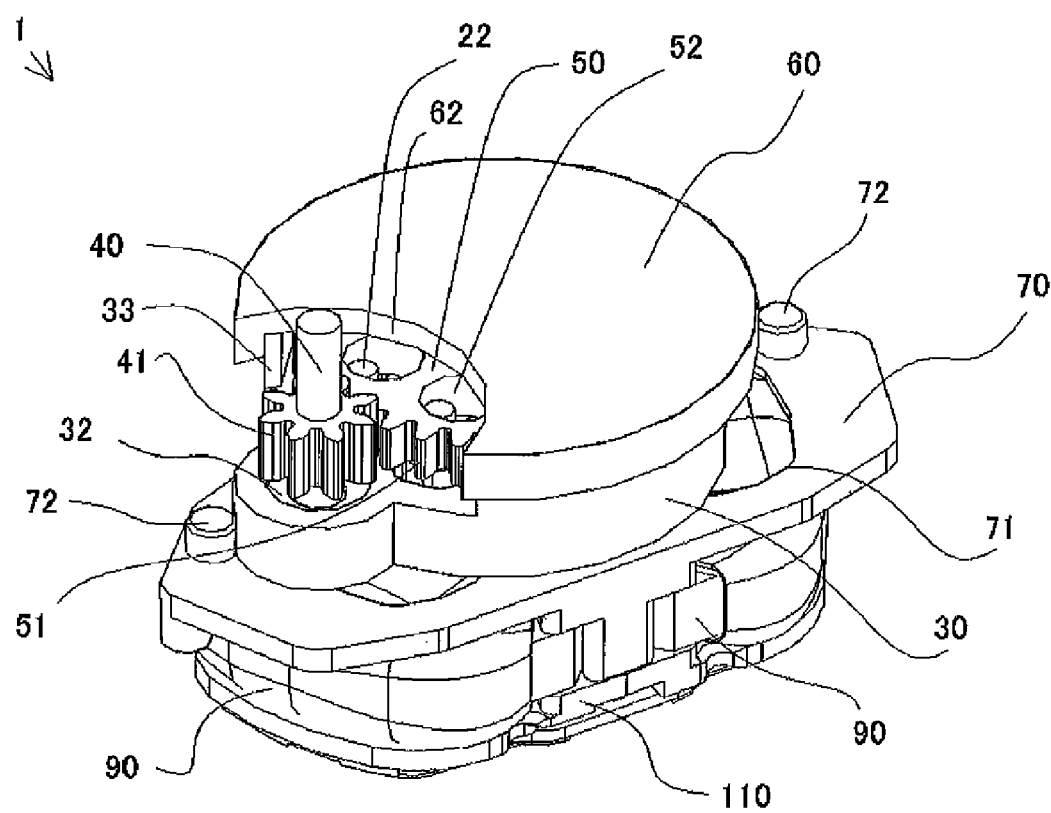
FIG. 1 is a perspective view of a reduction gear.
Figure 2:
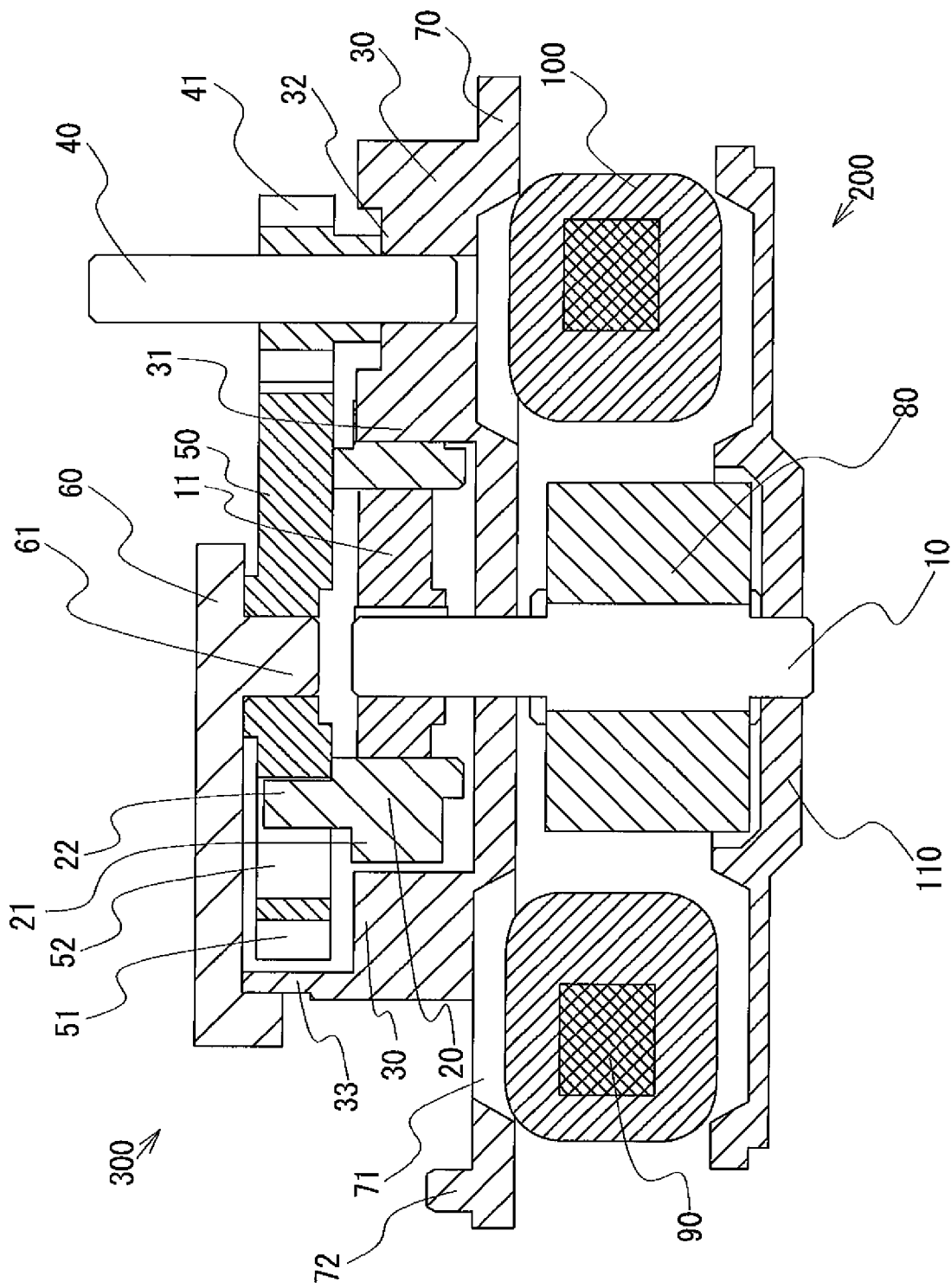
FIG. 2 is a cross sectional view of the reduction gear.

Referring to FIGS. 1 and 2, a reduction gear according to an embodiment of the present invention will be explained. FIG. 1 is a perspective view of the reduction gear. FIG. 2 is a cross sectional view of the reduction gear.

As shown in FIGS. 1 and 2, the reduction gear 1 includes: an input shaft 10; an eccentric body 11; an external gear 20 eccentrically rotatable about the input shaft 10; an internal gear 30 internally meshing with the external gear 20 and having a small number of teeth different from the external gear 20; an output shaft 40 for extracting a rotation of the external gear 20; a disk (extracting member) 50 for extracting only the rotation of the external gear 20; an upper cover 60; a positioning plate 70; a rotor 80; a stator 90; coil 100, and a motor cover 110. Additionally, a motor 200 includes the input shaft 10, the rotor 80, the stator 90, the coil 100, and the motor cover 110. A reduction gear mechanism 300 includes the input shaft 10, the external gear 20, the internal gear 30, and the output shaft 40.

The input shaft 10 rotates in conjunction with the rotor 80. The input shaft 10 passes through a hole formed, for the input shaft 10, in the positioning plate 70. Furthermore, the input shaft 10 connects to the external gear 20 at one end thereof through the eccentric body 11, and causes the external gear 20 to rotate.

The external gear 20 is provided with external teeth 21, serving as trochoid-type curves, at an outer periphery thereof. The trochoid-type curve is traced by the solution of cycloid. The external teeth 21 are in mesh with internal teeth 31 of the internal gear 30. Moreover, the external gear 20 is formed with pins 22 extending from a plain surface of the external gear 20 in a direction perpendicular to the plain surface of the external gear 20. The pins 22 are loosely fitted into pin holes 52.

The eccentric body 11 is eccentric to the input shaft 10 and rotates integrally with the input shaft 10. Further, the eccentric body 11 is attached to the external gear 20 and has sliding surfaces, which has a low sliding resistance, at a periphery of the eccentric body 11 which comes in contact with the external gear 20.

The internal gear 30 has the internal teeth 31 at an inner periphery of the internal gear 30. The internal teeth 31 are meshed with the external teeth 21, whereby the internal gear 30 is internally meshed with the external gear 20. The internal gear 30 is integrally formed in the positioning plate 70. The internal gear 30 is formed with a rim 33 at part of an outer periphery thereof. The rim 33 extends in the axial direction of the input shaft 10 and is in contact with the upper cover 60. In addition, the internal gear 30 is integrally formed with a bearing portion 32 for rotatably supporting the output shaft 40.

The disk 50 is formed with gear 51 at an external periphery thereof. The gear (transmitting member) 51 is meshed with gear (transmitting member) 41 of the output shaft 40. The output shaft 40 is rotatably supported by the bearing portion 32 as mentioned below. Therefore, the output shaft 40 rotates in response to the rotation of the disk 50. Furthermore, the disk 50 is formed with the pin holes 52.

The output shaft 40 is integrally formed with gear 41 at the outer periphery thereof. The output shaft 40 is not arranged on the axis of the input shaft 10. Additionally, the output shaft 40 is arranged in parallel with the input shaft 10.

Referring specifically to FIG. 2, the disk 50, the output shaft 40, and the gears 41 and 51 are arranged to be aligned in the direction perpendicular to the axial direction of the input shaft 10. Specifically, the output shaft 40 is adjacent to the disk 50 so that the gears 41 and 51 are meshed with each other. In view of the radius of the disk 50 and that of the output shaft 40, the bearing portion 32 is positioned so that the gear 41 and the gear 51 are meshed with each other.

In this manner, the disk 50, the output shaft 40, and gears 41 and 51 are arranged in alignment with the direction perpendicular to the axial direction of the input shaft 10, whereby the thickness of the reduction gear 1 can be reduced in the direction of the axis and be downsized, as compared to where an input shaft, an outputting member, a transmitting member, and an output shaft are arranged in alignment with the axial direction. Also, the rotational component of the external gear 20 can be transmitted in the direction perpendicular to the axial direction of the input shaft 10.

The upper cover 60 has a disk shape and partially has a recess portion 62 enabling the gear 41 to be attached to the reduction gear 1. The recess portion 62 as shown in FIG. 1 is formed so as not to interfere with a bearing portion, not shown, of the output shaft 40. The upper cover 60 is fixed on an upper end of the rim 33. Further, the upper cover 60 is provided with a spindle 61 projecting to the positioning plate 70. The disk 50 is rotatably supported by the spindle 61. Additionally, the spindle 61 is formed in alignment with the input shaft 10.

The coil 100 is wound around the stator 90.

The motor cover 110 rotatably supports the input shaft 10 and holds the stator 90 wound with the coil 100.

As shown in FIG. 2, the positioning plate 70 is formed with the hole through which the input shaft 10 passes. Therefore, the input shaft 10 is positioned by the positioning plate 70. Additionally, positioning guidable portions, not shown, are formed in the positioning plate 70 for positioning the stator 90, which is wound with the coil 100, and the motor cover 110. This enables the motor 200 to be positioned.

As mentioned above, the positioning plate 70 is sandwiched between the reduction gear mechanism 300 and the motor 200, and positions the reduction gear mechanism 300 at a front face of the positioning plate 70. Also, the positioning plate 70 positions the motor 200, which transmits the driving force to the input shaft 10, at a rear face of the positioning plate 70. This enables a single member to position the reduction gear mechanism 300 and the motor 200. This makes it possible to reduce the axial thickness of the reduction gear 1 including the motor 200. Also, the single member enables the reduction gear mechanism 300 and the motor 200 to be positioned, so that it is possible to improve the assembling ability, leading to the reduced manufacturing cost.

Furthermore, coil releasing holes 71 have the ability to release the thickness of the coil 100. This reduces the thickness in the axial direction of the reduction gear 1. Also, the positioning plate 70 has guiding portions 72 for positioning the reduction gear 1. Therefore, the output shaft 40 can be attached with highly accuracy.

Figure 3:
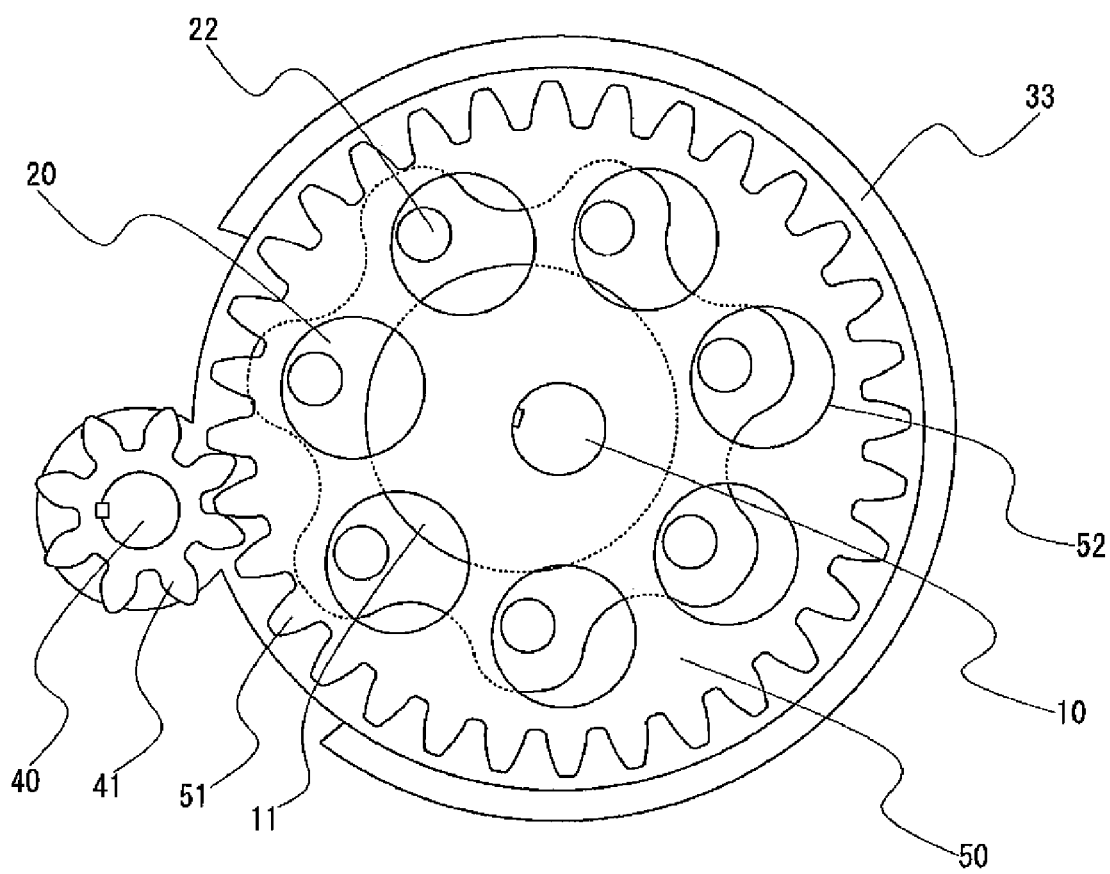
FIG. 3 is a view of an output shaft and a disk.
Figure 4:
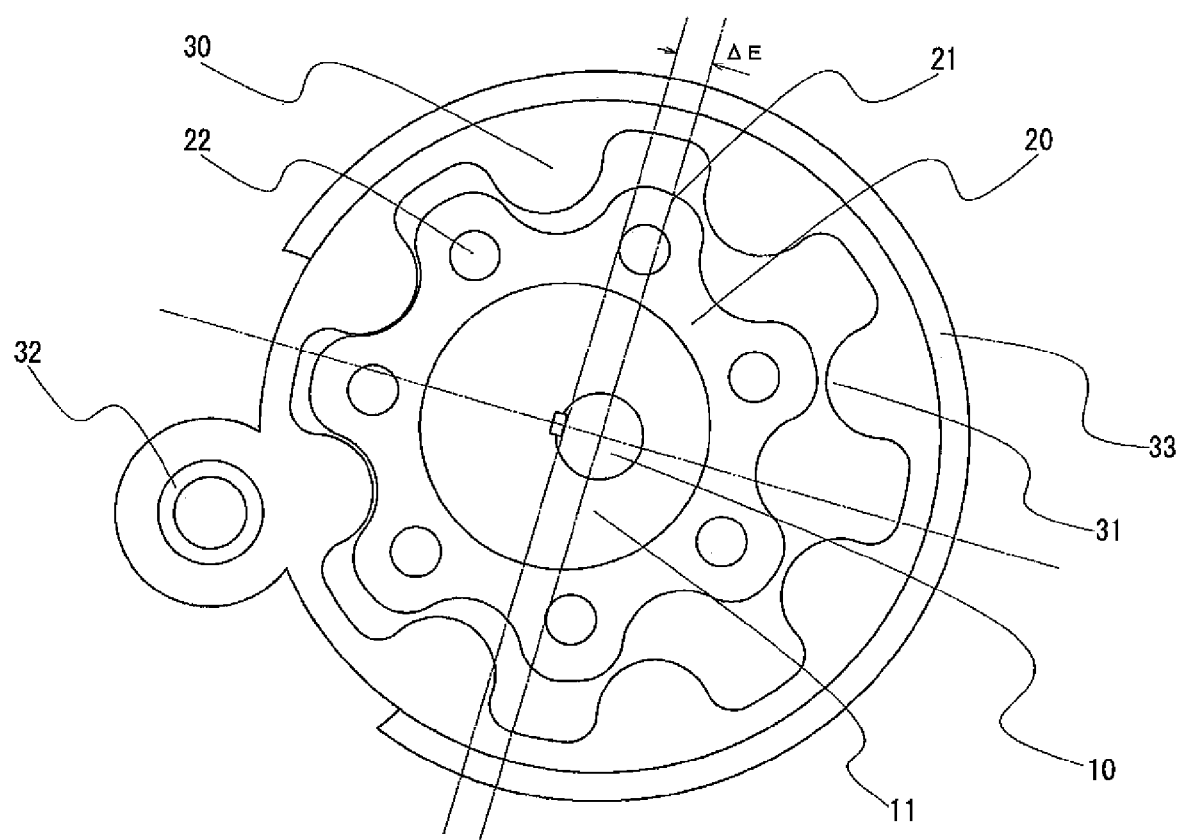
FIG. 4 is a view of an internal gear and an external gear.

A description will be given of, with reference to FIGS. 3 and 4, the action of the reduction gear. FIG. 3 is a view showing the output shaft 40 and the disk 50. FIG. 4 is a view showing the internal gear 30 and the external gear 20.

As shown in FIG. 3, the pins 22 loosely fit in the holes 52. The rotation of the external gear 20 allows the rotational component of the external gear 20 to be transmitted to the disk 50 via the pins 22. Therefore, the disk 50 rotates in response to the rotation of the external gear 20. The holes 52 causes a swing movement, as will be described later, of the eternal gear 20 to be absorbed.

As show in FIG. 4, the external gear 20 eccentrically rotates about the axis of the input shaft 10. One rotation of the input shaft 10 allows the eccentric body 11 to be rotated accordingly. This rotation of the eccentric body 11 will cause the external gear 20 to rotate, however, the free rotation of the external gear 20 is restricted because the external gear 20 and the internal gear 30 are meshed with each other, and the external gear 20 rotates with the swing movement while being meshed with the internal gear 30

When the degree of the eccentricity is denoted by ΔE, the external gear 20 swings in a circle with a radius corresponding to ΔE. As a result, the meshed position of the external gear 20 and the internal gear 30 is shifted in sequence, and one rotation of the input shaft 10 causes the external gear 20 to be out of phase with the internal gear 30 by a small number of difference between the teeth of the external gear 20 and those of the internal gear 30 (in this embodiment, eight minus seven equals one). This means that the above one rotation of the input shaft 10 results in the reduction in the speed to "minus one-seventh". The one rotation of the input shaft 10 is reduced to being minus one seventh rotation of the external gear 20 ("minus" means reverse rotation).

As mentioned above, the only rotational component of the external gear 20 is outputted to the disk 50. This can achieve reduction ratio of minus one seventh between the input shaft 10 and the disk 50. The output shaft 40 rotates with respect to the disk 50. This allows the rotation of the input shaft 10 to be changed and outputted to the output shaft 40.

Furthermore, in the reduction gear 1 in accordance with the present embodiment, the gear 51 of the disk 50 has 32 teeth and the gear 41 of the output shaft 40 has eight teeth. Therefore, seven rotations of the input shaft 10 allow one rotation of the disk 50 and four rotations of the output shaft 40. Consequently, the reduction ratio of four sevenths is achieved between the input shaft 10 and the output shaft 40.

In this manner, the disk 50 rotates in response to the rotation of the external gear 20. The gear 41 being meshed with the gear 51 allows the output shaft 40 to rotate in response to the rotation of the disk 50.

Moreover, by changing in the number of teeth of the gear 41 or that of the gear 51, the reduction ratio between the input shaft 10 and the output shaft 40 can be changed with easy without changing in the number of teeth of the external gear 20 or those of the internal gear 30. Specifically, supposing that the output shaft 40 and the gear 41 are integrally formed with each other and made of resin and the disk 50 is made of resin. There are arranged multiple output shafts 40 each provided with the gear 41 having different numbers of teeth and multiple disks 50 each provided with the gear 51 having different numbers of teeth. According to use application of the reduction gear 1, thereby changing the reduction ratio with easy.

Furthermore, the disk 50 extracts only the rotational component of the external gear 20. Therefore, as compared to where an external gear is directly rotated by a belt member and output shaft is rotated in response to the external gear, the output shaft 40 is not affected by the swingable component of the external gear 20.

Additionally, as compared to where the output shaft is rotated by the belt member, a center distance between the input shaft 10 and the output shaft 40 can be shortened. Therefore, the width, perpendicular to axial direction, of the reduction gear 1 can be minimized.

Moreover, as shown in FIG. 4, the output shaft 40 is rotatably supported by the bearing portion 32 integrally formed in the internal gear 30. The bearing portion 32 is located in an area that does not affect the meshing of the external teeth 21 and the internal teeth 31 of the internal gear 30. The output shaft 40 can be positioned by the internal gear 30. This eliminates the need for separately providing a positioning member or a bearing portion for the output shaft 40, thus reducing the number of parts and facilitating the assembling process.

While the preferred embodiments of the present invention have been illustrated in detail, the present invention is not limited to the above-mentioned embodiments, and other embodiments, variations and modifications may be made without departing from the scope of the present invention.

In the above embodiment, the input shaft is also served as a motor shaft, although the present invention is not limited to the above configuration.

Additionally, in the above embodiment, the internal gear and the positioning plate are integrally formed, and present invention is not limited to the above configuration. The internal gear and the positioning plate may be separately formed.

What is claimed is:

1. A reduction gear comprising:
   a motor including, an input shaft, a rotor rotating in conjunction with the input shaft, a stator, and a coil wound around the stator;
   a reduction mechanism including, an external gear eccentrically rotatable about an input shaft, an internal gear internally meshing with the external gear and having a small number of difference between the teeth of the internal gear and the external gear, a extracting member for extracting only a rotational component of the external gear, an output shaft, and a transmitting member for transmitting the rotational component of the external gear from the extracting member to the output shaft; and
   a positioning plate sandwiched between the reduction mechanism and the motor,
   wherein the positioning plate has a hole for receiving a thickness of the coil,
   the extracting member, the transmitting member, and the output shaft are aligned in a direction perpendicular to an axial direction of the input shaft, and
   the output shaft and the input shaft are not aligned on an identical axis.

2. The reduction gear according to claim 1, wherein the extracting member is rotated in response to a rotation of the external gear, and the transmitting member includes gears being each formed in the extracting member and the output shaft, the gears being meshed with each other.

3. The reduction gear according to claim 1, wherein the output shaft is rotatably supported by a bearing portion integrally formed in the internal gear.

4. The reduction gear according to claim 1, wherein the positioning plate has a front face for positioning the reduction mechanism and a back face for positioning the motor transmitting a driving force to the input shaft.

* * * * *